United States Patent
Yoo et al.

(10) Patent No.: US 10,650,220 B2
(45) Date of Patent: May 12, 2020

(54) SECURITY DEVICE AND SECURITY SYSTEM INCLUDING THE SAME

(71) Applicant: SAMSUNG DISPLAY CO., LTD., Yongin-si, Gyeonggi-do (KR)

(72) Inventors: Byung Han Yoo, Yongin-si (KR); Ki Seo Kim, Yongin-si (KR); Jae Kyoung Kim, Yongin-si (KR); Kyung Tea Park, Yongin-si (KR); Won Sang Park, Yongin-si (KR); Jong In Baek, Yongin-si (KR); Byeong Hee Won, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 58 days.

(21) Appl. No.: 15/868,166

(22) Filed: Jan. 11, 2018

(65) Prior Publication Data
US 2018/0211077 A1    Jul. 26, 2018

(30) Foreign Application Priority Data

Jan. 26, 2017   (KR) .......................... 10-2017-0012410

(51) Int. Cl.
| | |
|---|---|
| *G06K 9/00* | (2006.01) |
| *G06F 3/044* | (2006.01) |
| *A01K 5/02* | (2006.01) |
| *A01K 29/00* | (2006.01) |
| *A01K 5/01* | (2006.01) |

(52) U.S. Cl.
CPC ............ *G06K 9/001* (2013.01); *A01K 5/0142* (2013.01); *A01K 5/0233* (2013.01); *A01K 29/005* (2013.01); *G06F 3/044* (2013.01); *G06K 9/0002* (2013.01); *G06F 2203/04105* (2013.01)

(58) Field of Classification Search
CPC ...... G06K 9/001; G06K 9/0002; G06F 3/044; G06F 2203/04105; A01K 5/0233; A01K 29/005; A01K 5/0142
See application file for complete search history.

(56) References Cited

U.S. PATENT DOCUMENTS

| | | | |
|---|---|---|---|
| 10,137,859 B2* | 11/2018 | van Roermund | ....... B60R 25/04 |
| 10,185,867 B1* | 1/2019 | Ryshtun | ............... G06K 9/0008 |
| 2004/0207511 A1* | 10/2004 | McEwan | ............ G07C 9/00309 340/5.61 |
| 2011/0181387 A1* | 7/2011 | Popelard | ............... B60R 25/246 340/5.2 |

(Continued)

FOREIGN PATENT DOCUMENTS

| | | |
|---|---|---|
| KR | 200327501 Y1 | 9/2003 |
| KR | 1020160036595 A | 4/2016 |

(Continued)

*Primary Examiner* — Amir Alavi
(74) *Attorney, Agent, or Firm* — Cantor Colburn LLP

(57) ABSTRACT

A security device includes a door handle unit disposed on a door body, a cover layer including a touch sensor and covering the door handle unit, a door locking unit which controls a locking of the door body. The touch sensor may include a plurality of sensor pixels, each including a sensor electrode which forms a second capacitor with a hand of a user when a touch occurs thereon by the user. The touch sensor may generate touch information based on a change in capacitance of the second capacitor corresponding to the touch.

9 Claims, 13 Drawing Sheets

(56) References Cited

U.S. PATENT DOCUMENTS

| | | |
|---|---|---|
| 2015/0082890 A1 | 3/2015 | Pant et al. |
| 2016/0132713 A1 | 5/2016 | Bae et al. |
| 2016/0224818 A1 | 8/2016 | Song et al. |
| 2016/0232395 A1 | 8/2016 | Han et al. |
| 2016/0292409 A1 | 10/2016 | Park et al. |
| 2018/0129849 A1* | 5/2018 | Strohmann ............. G06F 21/32 |
| 2018/0211077 A1* | 7/2018 | Yoo ........................ G06K 9/001 |
| 2019/0087621 A1* | 3/2019 | Khuri-Yakub ........ G06F 3/0436 |

FOREIGN PATENT DOCUMENTS

| | | |
|---|---|---|
| KR | 1020160057285 A | 5/2016 |
| KR | 1020160092373 A | 8/2016 |
| KR | 1020160093750 A | 8/2016 |
| KR | 1020160096257 A | 8/2016 |
| KR | 1020160097440 A | 8/2016 |
| KR | 1020160119528 A | 10/2016 |

* cited by examiner

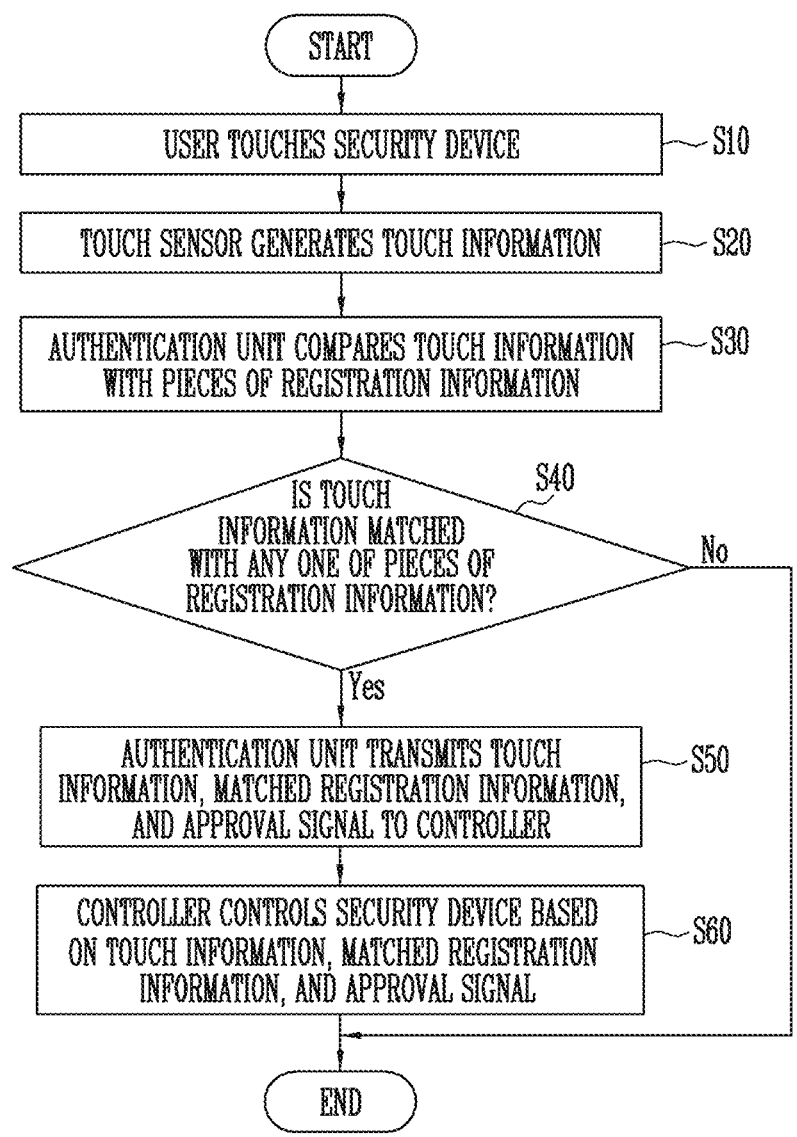

SECURITY DEVICE AND SECURITY SYSTEM INCLUDING THE SAME

The application claims priority to Korean patent application No. 10-2017-0012410 filed on Jan. 26, 2017, and all the benefits accruing therefrom under 35 U.S.C. § 119, the content of which in its entirety is herein incorporated by reference.

BACKGROUND

1. Field

Embodiments of the disclosure relate to a security device and a security system including the security device.

2. Description of Related Art

Conventional security systems have been realized in a password input manner or a fingerprint identification manner.

In the case of a password-input-type security system, a user may control the locking of a door by directly inputting a password using a dial pad or a display device capable of recognizing a touch.

In the case of a fingerprint-identification-type security system, the user may control the locking of a door by directly inputting fingerprint information to a fingerprint window.

SUMMARY

Embodiments of the disclosure are directed to a security device and a security system including the security device, which is capable of performing an authentication process at the moment that a user touches the security device, and which has improved security performance.

In an embodiment of the disclosure, a security device includes: a door handle unit disposed on a door body; a cover layer comprising a touch sensor, where the cover layer covers the door handle unit; and a door locking unit which controls a locking of the door body. In such an embodiment, the touch sensor includes a plurality of sensor pixels, each of which includes a sensor electrode which forms a second capacitor with a hand of a user when a touch occurs thereon by the user, and the touch sensor generates touch information based on a change in capacitance of the second capacitor corresponding to the touch.

In an embodiment, the touch information may include information about at least one of a fingerprint of the user and a palm print of the user.

In an embodiment, the touch sensor may further include a plurality of sensor scan lines connected to the plurality of sensor pixels, and output lines connected to the sensor pixels. In such an embodiment, a sensor pixel of the sensor pixels, which is connected to an i-th sensor scan line of the sensor scan lines and a j-th output line of the output lines, may include: a first transistor including a gate electrode connected to the sensor electrode, where the first transistor controls a current to be outputted through the j-th output line; a second transistor including a gate electrode coupled to the i-th sensor scan line, where the second transistor is connected between a reference voltage line and the first transistor; and a capacitor electrode which forms a first capacitor with the sensor electrode, and connected to the i-th sensor scan line, where i is an integer number equal to or greater than 2, and j is a natural number.

In an embodiment, the sensor pixel may further include a third transistor including a gate electrode coupled to an (i−1)-th scan line of the scan lines, and the third transistor may be connected between the reference voltage line and the sensor electrode.

In an embodiment, the security device may authenticate the user based on the touch information.

In an embodiment, the cover layer may further include a pressure sensor which generates pressure information about a change in pressure of the touch of the user, and the touch information may include the pressure information.

In an embodiment, the cover layer may further include a display panel which displays an image based on the touch information.

In an embodiment, the cover layer may further include a haptic module which generates a haptic effect based on the touch information.

In an embodiment, the security device may further include a door driving unit which performs an operation of opening or closing the door body based on the touch information.

In an embodiment, the cover layer may have flexibility and may cover an entire surface of the door handle unit.

In another embodiment of the disclosure, a security system includes: a security device including a door body, a door handle unit, and a cover layer which covers the door handle unit; an authentication unit which authenticates a user based on touch information; and a controller which controls the security device based on the touch information and a result of the authentication. In such an embodiment, the cover layer includes a touch sensor which generates the touch information about a touch of the user, and the touch sensor includes a plurality of sensor pixels which senses a change in capacitance corresponding to the touch.

In an embodiment, the touch information may include information about at least one of a fingerprint of the user and a palm print of the user.

In an embodiment, the authentication unit may include: an authentication processing unit which compares the touch information with registration information data, and transmit the touch information, matched registration information data, and an approval signal to the controller when the touch information is matched with one of the registration information data, where the matched registration information is the matched one of the registration information data; a user information storage unit which stores the registration information data; and a temporary information storage unit which stores the touch information.

In an embodiment, the security device may further include a door locking unit configured to control locking of the door body. In such an embodiment, the controller may control the door locking unit to unlock the door body in response to the approval signal.

In an embodiment, the security device may further include a door driving unit which performs an operation of opening the door body or an operation of closing the door body. In such an embodiment, the controller may control the door driving unit to perform the operation of opening the door body in response to the approval signal.

In an embodiment, the door handle unit may include a handle disposed on the door body.

In an embodiment, each of the sensor pixels may include a sensor electrode which forms a second capacitor with a hand of the user when the touch of the user occurs thereon. In such an embodiment, the touch sensor may generate the touch information based on a change in capacitance of the second capacitor corresponding to the touch.

In an embodiment of the disclosure, a security system includes: a security device comprising a plurality of door bodies, a door handle unit, and a cover layer which covers the door handle unit; an authentication unit which authenticates a pet based on touch information; and a controller which controls the door bodies based on the touch information and a result of the authentication. In such an embodiment, the cover layer includes a touch sensor which generates the touch information including information about a feature point of a foot sole of the pet when a touch occurs thereon by the pet, and the touch sensor includes a plurality of sensor pixels which senses a change in capacitance corresponding to the touch by the pet.

In an embodiment, the authentication unit may include: an authentication processing unit which compares the touch information with registration information data, and transmit the touch information, matched registration information, and an approval signal to the controller when the touch information is matched with one of the registration information data, where the matched registration information data is the matched one of the registration information data; a user information storage unit which stores the registration information data; and a temporary information storage unit which stores the touch information.

In an embodiment, each of the sensor pixels may include a sensor electrode which forms a second capacitor with the foot sole of the pet when the touch occurs thereon by the pet. In such an embodiment, the touch sensor may generate the touch information based on a change in capacitance of the second capacitor corresponding to the touch by the pet.

BRIEF DESCRIPTION OF THE DRAWINGS

The above and other features of the invention will become more apparent by describing in further detail exemplary embodiments thereof with reference to the accompanying drawings, in which:

FIG. 11 is a flowchart illustrating a method of operating the security system in accordance with an embodiment of the disclosure.

DETAILED DESCRIPTION

Figure 1A:
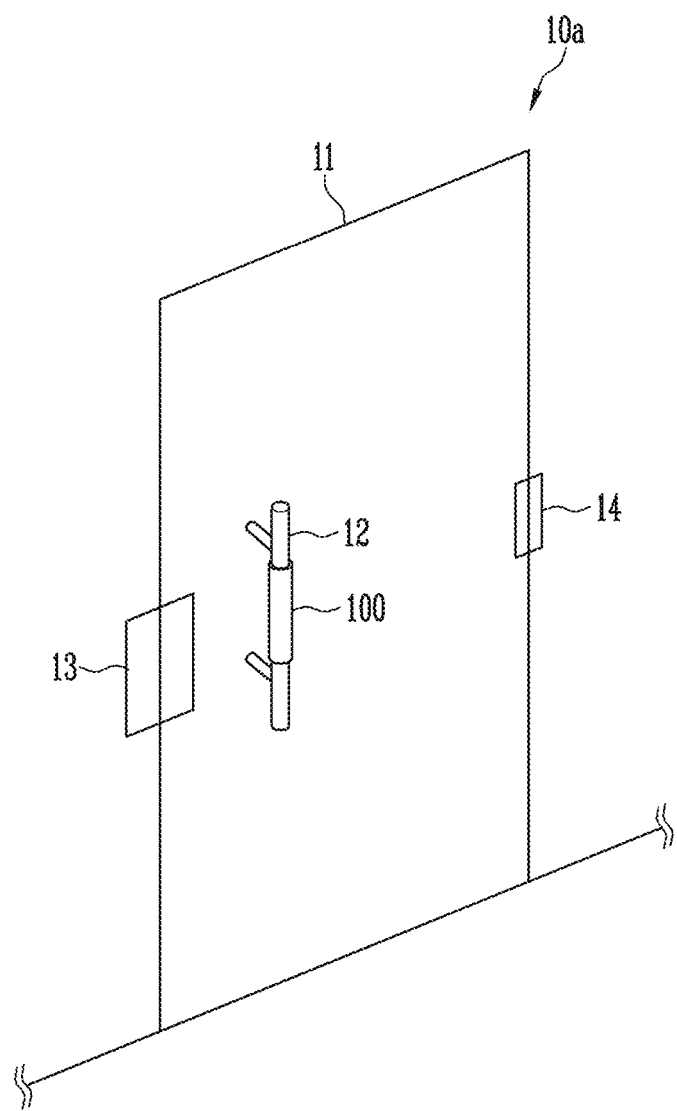
FIG. 1A is a diagram illustrating a security device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", etc. may be used herein to describe various components, these components should not be limited by these terms. These terms are only used to distinguish one component from other components. Thus, "a first component" discussed below could be termed a second component without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIGS. 1A to 1E are diagrams illustrating a security device in accordance with embodiments of the disclosure. For convenience of description, reference numerals "10a" to "10e" in FIGS. 1A to 1E refer to respective embodiments of a security device. The same reference numerals are used to designate same or like elements, and detailed descriptions thereof may be omitted or simplified if deemed redundant.

FIG. 1A illustrates a security device 10a embodied in a gate door, in accordance with an embodiment of the disclosure. Referring to FIG. 1A, an embodiment of the security device 10a may include a door body 11, a door handle unit 12, a door locking unit 13, a door driving unit 14, and a cover layer 100.

The door body 11 may be a door in the form of a plate which is flush with a wall.

In an embodiment, the door handle unit 12 may include a cylindrical handle.

The door handle unit 12 may be attached to or mounted on the door body 11. However, the disclosure is not limited to this.

The door locking unit 13 may control locking of the door body 11. In one embodiment, for example, the door locking unit 13 may use a locking bar to control the locking of the door body 11. The door locking unit 13 may lock the door body 11 by fastening the locking bar to the wall, or unlock the door body 11 by releasing the locking bar from the wall. However, the disclosure is not limited to this.

The door driving unit 14 may perform an operation of opening or closing the door body 11. In one embodiment, for example, the door driving unit 14 may manually or automatically perform the operation of opening or closing the door body 11.

In an embodiment, where the door driving unit 14 manually performs the operation of the door body 11, the door driving unit 14 may hold the door body 11 to allow the door body 11 to rotate with respect to an axis of the door driving unit 14 by an external force of a user.

In an embodiment, where the door driving unit 14 automatically performs the operation of the door body 11, the door driving unit 14 may rotate the door body 11 with respect to the axis of the door driving unit 14. However, the disclosure is not limited to this.

The cover layer 100 may cover the door handle unit 12. Herein, the term "covering" may refer to covering a target with a film. The cover layer 100 may be in direct contact with the hand of the user.

Referring to FIG. 1A, a registered user may be authenticated by the security device 10a when the user merely touches the door handle unit 12 without performing a separate operation for the authentication. Here, the security device 10a may perform an authentication process based on a touch of the user on the cover layer 100.

The cover layer 100 will be described in greater detail later with reference to FIGS. 2A to 2C.

Figure 1B:
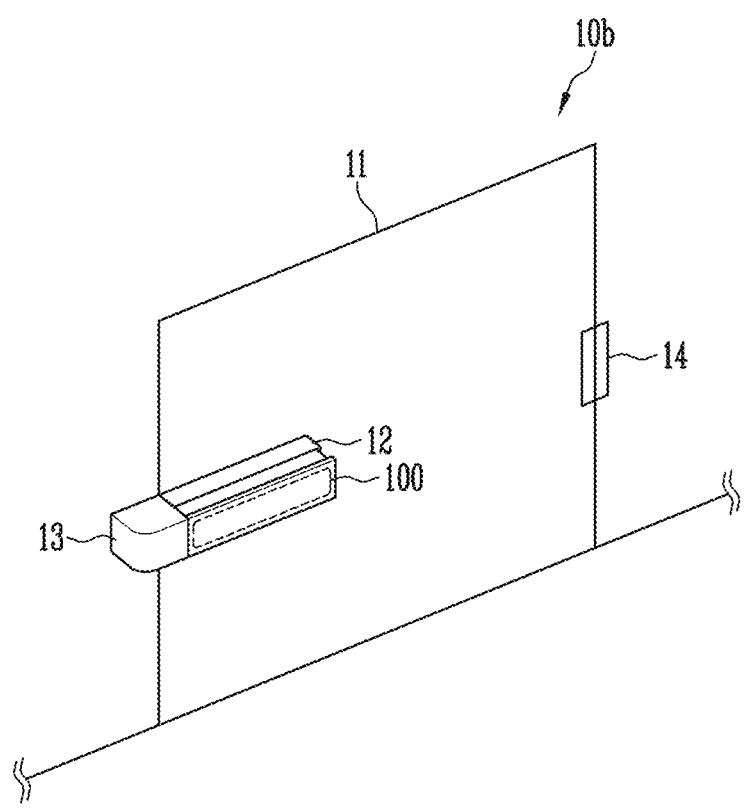
FIG. 1B is a diagram illustrating a security device in accordance with an embodiment of the disclosure.

FIG. 1B illustrates a security device 10b embodied in a gate door in accordance with an alternative embodiment of the disclosure. Referring to FIG. 1B, an embodiment of the security device 10b may include a door body 11, a door handle unit 12, a door locking unit 13, a door driving unit 14, and a cover layer 100.

In an embodiment, the door handle unit 12 may include a switch having a planar structure. The door handle unit 12 may be disposed or mounted on the door body 11. However, the disclosure is not limited to this.

Figure 1C:
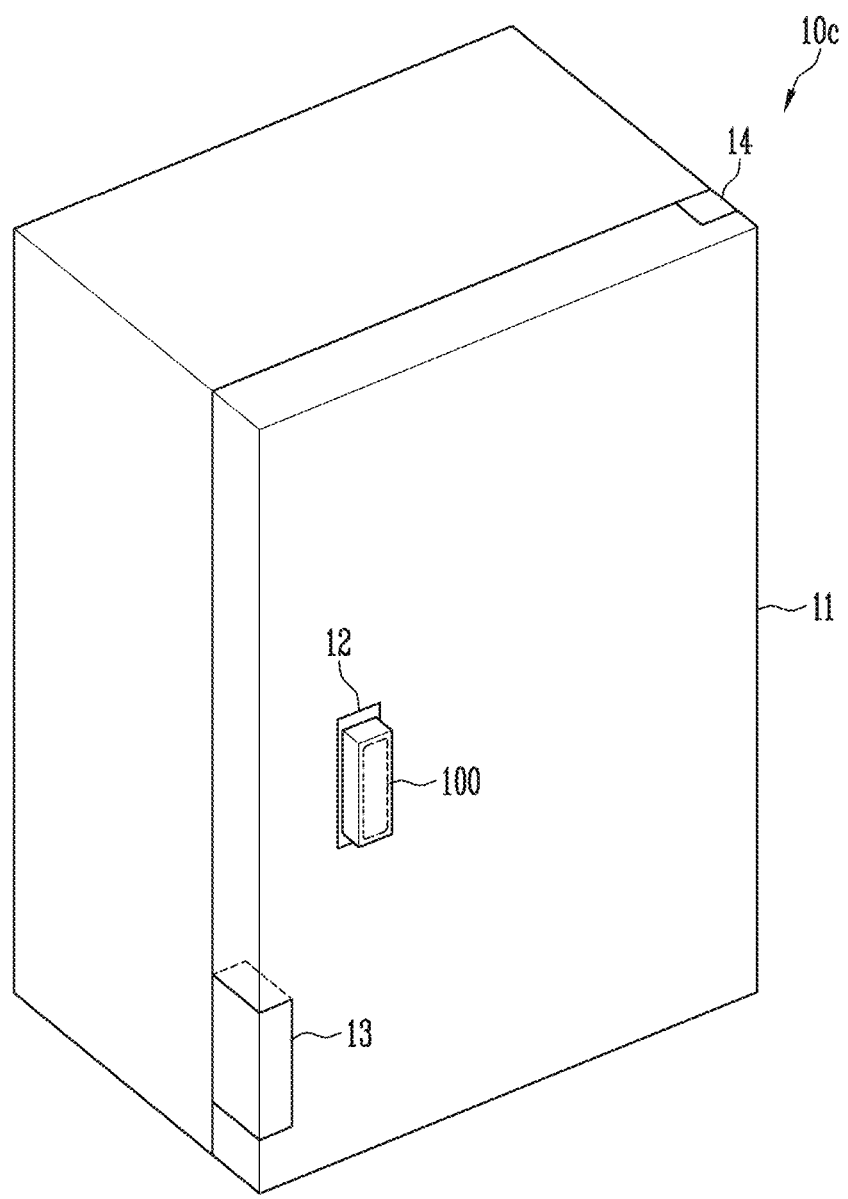
FIG. 1C is a diagram illustrating a security device in accordance with an embodiment of the disclosure.

FIG. 1C illustrates a security device 10c embodied in a door of a refrigerator in accordance with another alternative embodiment of the disclosure. Referring to FIG. 1C, the security device 10c may include a door body 11, a door handle unit 12, a door locking unit 13, a door driving unit 14, and a cover layer 100.

The door handle unit 12 may include a switch having a planar structure. In an embodiment, the door handle unit 12 may be mounted on the door body 11. However, the disclosure is not limited to this.

Figure 1D:
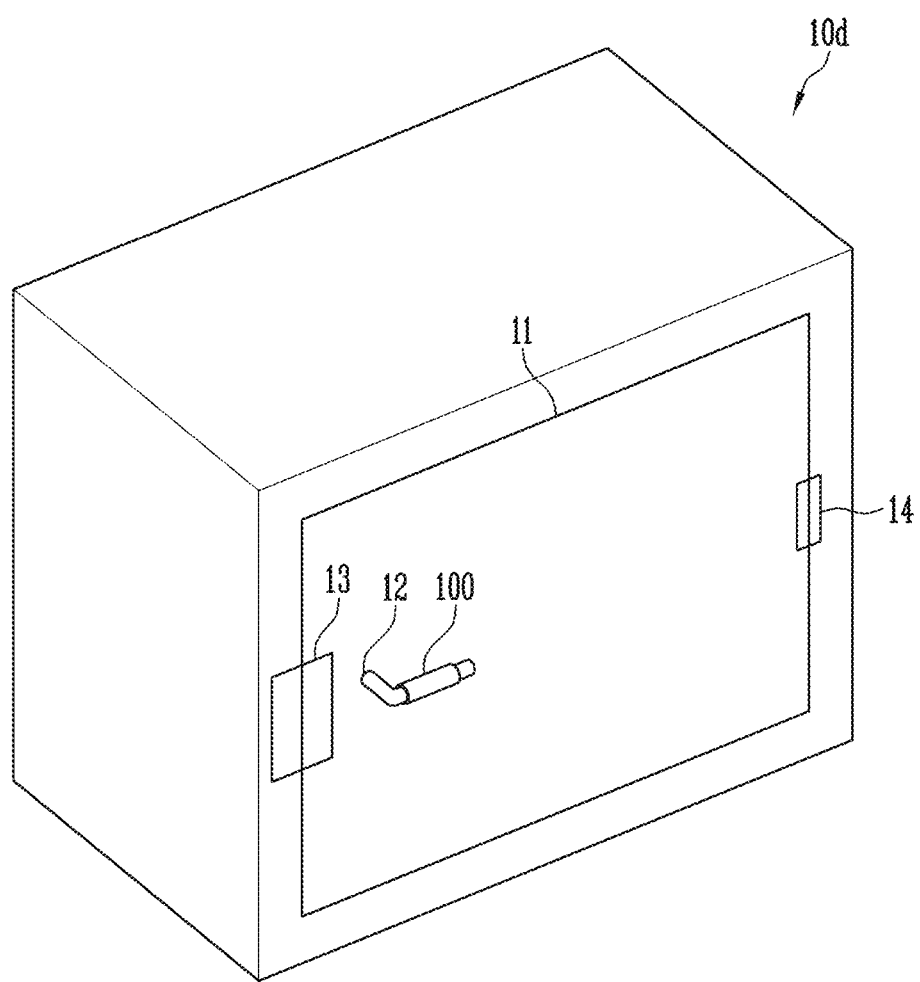
FIG. 1D is a diagram illustrating a security device in accordance with an embodiment of the disclosure.

FIG. 1D illustrates a security device 10d embodied in a door of a safe in accordance with another alternative embodiment of the disclosure. Referring to FIG. 1D, the security device 10d may include a door body 11, a door handle unit 12, a door locking unit 13, a door driving unit 14, and a cover layer 100.

In an embodiment, the door handle unit 12 may include an L-shaped handle. The door handle unit 12 may be disposed or mounted on the door body 11. However, the disclosure is not limited to this. In one alternative embodiment, for example, the door handle unit 12 may be embodied in the form of a planar support covered with a cover layer 100 having a relatively large surface area.

Figure 1E:
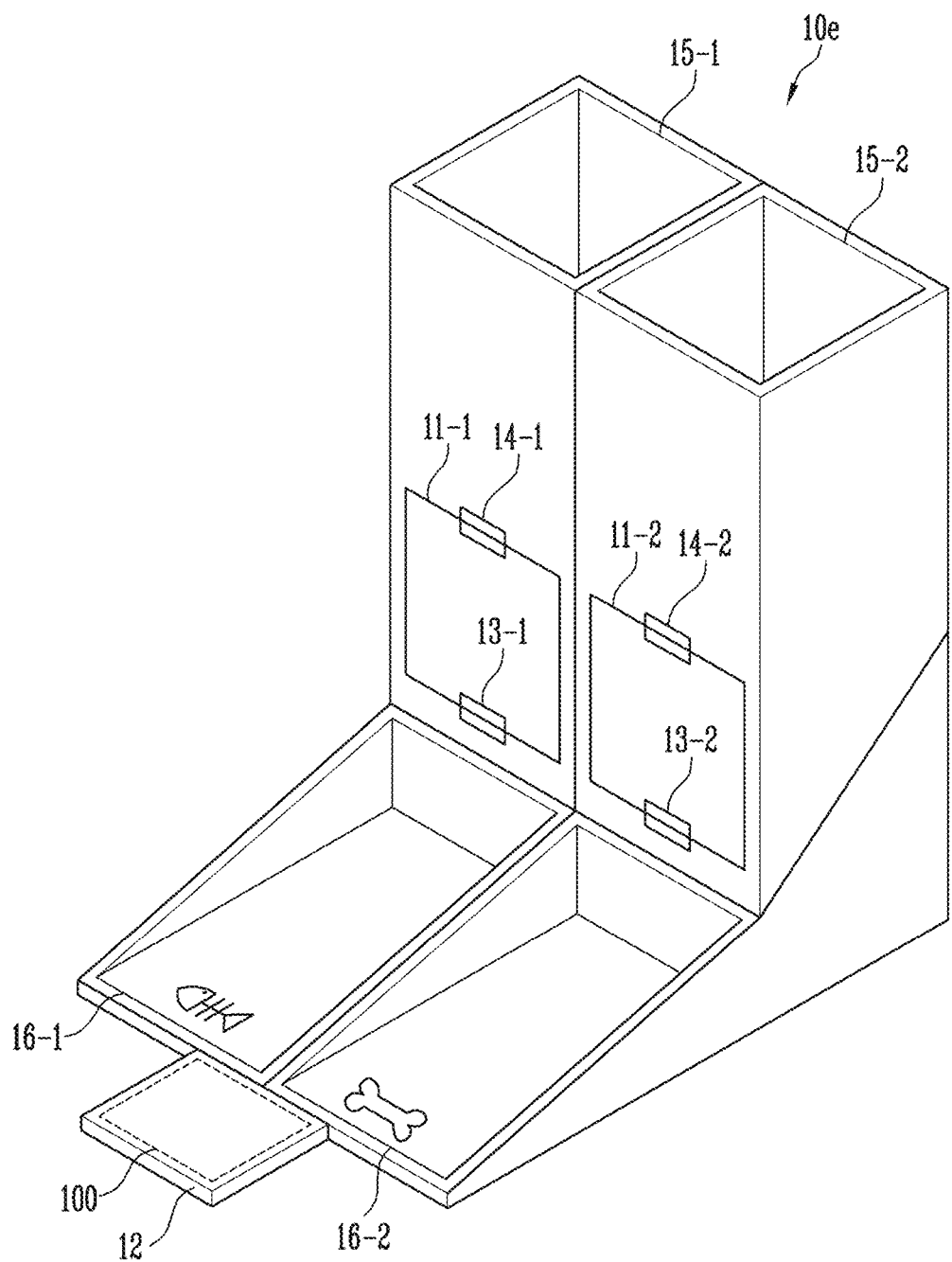
FIG. 1E is a diagram illustrating a security device in accordance with an embodiment of the disclosure.

FIG. 1E illustrates a security device 10e embodied in a feeder for pets in accordance with another alternative embodiment of the disclosure. Referring to FIG. 1E, the security device 10e may include first and second door bodies 11-1 and 11-2, a door handle unit 12, first and second door locking units 13-1 and 13-2, first and second door driving units 14-1 and 14-2, first and second feedboxes 15-1 and 15-2, first and second feed receivers 16-1 and 16-2, and a cover layer 100.

The first and second door bodies 11-1 and 11-2 may be blocking plates which control the movement of feed from the first and second feedboxes 15-1 and 15-2 to the first and second feed receivers 16-1 and 16-2, respectively. Each of the first and second door bodies 11-1 and 11-2 may be a door having a planar shape.

The door handle unit 12 may include a switch having a planar structure. In an embodiment, the door handle unit 12 may be disposed at a position spaced apart from the first and second door bodies 11-1 and 11-2. However, the disclosure is not limited to this.

The first and second door locking units 13-1 and 13-2 may respectively control the locking of the first and second door bodies 11-1 and 11-2. In one embodiment, for example, each of the first and second door locking units 13-1 and 13-2 may use a locking bar to control the locking of the corresponding one of the first and second door bodies 11-1 and 11-2.

In an embodiment, each of the first and second door locking units 13-1 and 13-2 may fasten the locking bar to the corresponding one of the first and second feedbox 15-1 and 15-2, thus locking the corresponding one of the first and second door bodies 11-1 and 11-2.

In an embodiment, each the first and second door locking units 13-1 and 13-2 may release the locking bar from a sidewall of the corresponding one of the first and second feedboxes 15-1 and 15-2, thus unlocking the corresponding one of the first and second door bodies 11-1 and 11-2. However, the disclosure is not limited to this.

The first and second door driving units 14-1 and 14-2 may respectively perform operations of opening or closing the first and second door bodies 11-1 and 11-2.

The first and second feedboxes 15-1 and 15-2 may separately store different kinds of feed for various pets. The pets may not be allowed to eat the feed stored in the first or second feedbox 15-1 or 15-2.

The first and second feed receivers 16-1 and 16-2 may receive feed for various pets which are supplied from the first and second feedboxes 15-1 and 15-2, respectively. The pets may be allowed to eat the feed received in the first or second feed receiver 16-1 or 16-2.

The cover layer 100 may cover the door handle unit 12. The cover layer 100 may be in direct contact with the foot of a pet. Herein, as described above, the term "covering" may refer to covering a target with a film.

Referring to FIG. 1E, a registered pet may be authenticated by the security device 10e when the pet merely touches the door handle unit 12. The security device 10e may perform an authentication process based on touch information generated based on a touch on the cover layer 100.

The cover layer 100 will be described in greater detail later with reference to FIGS. 2A to 2C.

In one embodiment, for example, feed for cats may be stored in the first feedbox 15-1 and feed for dogs may be stored in the second feedbox 15-2. In such an embodiment, when a registered cat touches the door handle unit 12, the security device 10e may perform an authentication process based on information about the touch on the cover layer 100.

Then, the registered cat is authenticated as an authorized cat. When the registered cat is authenticated, the first door locking unit 13-1 may unlock the first door body 11-1, and the first door driving unit 14-1 may perform the operation of opening the first door body 11-1.

Consequently, the feed for cats that has been stored in the first feedbox 15-1 is supplied to the first feed receiver 16-1.

After an appropriate amount of feed has been supplied to the first feed receiver 16-1, the first door driving unit 14-1 may perform the operation of closing the first door body 11-1, and the first door locking unit 13-1 may lock the first door body 11-1.

Accordingly, the registered cat is allowed to eat the feed received in the first feed receiver 16-1.

If a registered dog touches the door handle unit 12, the security device 10e may perform an authentication process based on information about the touch made on the cover layer 100.

Then, the registered dog is authenticated as an authorized dog. When the registered dog is authenticated, the second door locking unit 13-2 may unlock the second door body 11-2, and the second door driving unit 14-2 may perform the operation of opening the second door body 11-2.

Thus, the feed for dogs that has been stored in the second feedbox 15-2 may be supplied to the second feed receiver 16-2.

After an appropriate amount of feed has been supplied into the second feed receiver 16-2, the second door driving unit 14-2 may perform the operation of closing the second door body 11-2, and the second door locking unit 13-2 may lock the second door body 11-2.

Accordingly, the registered dog is allowed to eat the feed received in the second feed receiver 16-2.

As described above, in the case where there are various pets, the security device 10e allows each pet to have suitable feed.

In an embodiment, as shown in FIGS. 1A to 1E, the cover layer 100 may cover a partial portion of the door handle unit 12, but the disclosure is not limited thereto. In one alternative embodiment, for example, the cover layer 100 may cover the entire portion of the surface of the door handle unit 12.

In an embodiment, the cover layer 100 may be flexible or have flexibility. Herein, the term "flexibility" refers to bendability of an object, or the characteristic in which the object can be deformed without being damaged.

Although not shown in FIGS. 1A to 1E, an embodiment of the security device 10a to 10e may further include a door indication unit (not shown) and a door power supply (not shown).

Figure 10:
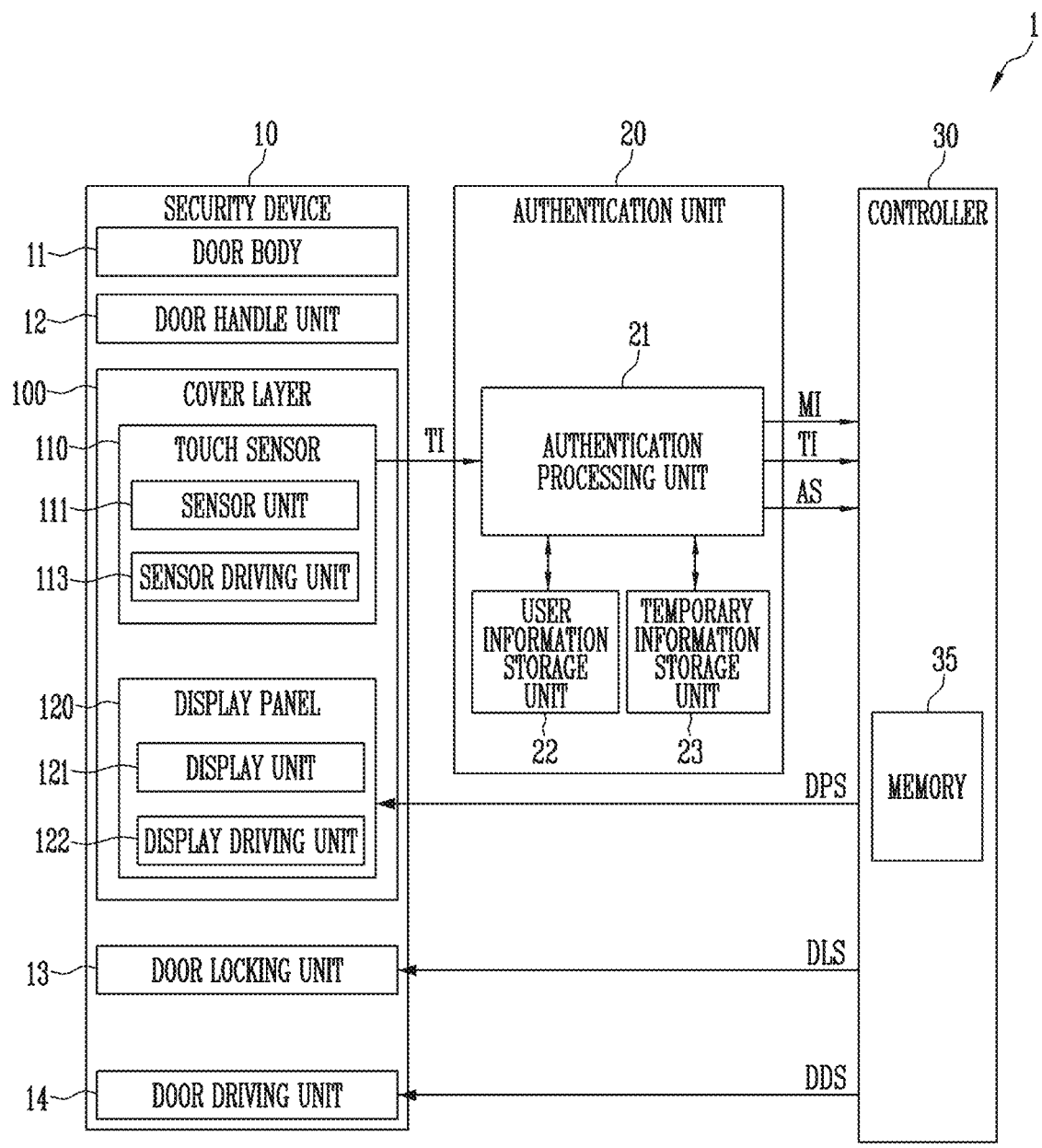
FIG. 10 is a diagram illustrating a security system in accordance with an embodiment of the disclosure.

The door indication unit (not shown) may emit light having a predetermined color under the control of a controller 30 (refer to FIG. 10). The door indication unit (not shown) may be embodied using a light emitting diode ("LED"). In one embodiment, for example, when the authentication has succeeded, the door indication unit (not shown) may emit blue (or green) light. In such an embodiment, when the authentication has failed, the door indication unit emits red light. However, the disclosure is not limited to this.

In an embodiment, the door indication unit (not shown) may be disposed in a region of the security device 10a to 10e.

The door power supply (not shown) may provide power to the security device 10a to 10e. In an embodiment, the door power supply (not shown) may be disposed in a portion of the security device 10a to 10e.

Figure 2A:
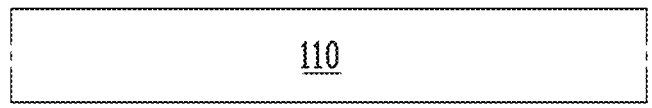
FIG. 2A is a diagram illustrating the structure of a cover layer in accordance with an embodiment of the disclosure.

FIG. 2A is a diagram illustrating the structure of a cover layer 100a in accordance with an embodiment of the disclosure. Referring to FIG. 2A, an embodiment of the cover layer 100a may include a touch sensor 110.

The touch sensor 110 may sense a touch of a user thereon. In one embodiment, for example, the touch may occur by a finger of the user, a palm of the user or the like, which is a part of a body of the user. A target to be sensed by the touch sensor 110 may include at least one of a fingerprint and a palm print.

The fingerprint or palm print of the user may include valleys and ridges. Operations of the touch sensor 110 will be described later in detail with reference to FIGS. 6A and 6B.

The touch sensor 110 may generate touch information on a touch of the user thereon. In one embodiment, for example, the touch information may include information about at least one of the fingerprint and the palm print of the user.

In an embodiment, the touch sensor 110 may sense a touch of a pet. In one embodiment, for example, the touch may be generated by the sole of the pet's foot, and a target to be sensed by the touch sensor 110 may include feature points of the sole of the pet's foot.

The feature points of the sole of the pet's foot may include valleys and ridges.

In an embodiment, the touch sensor 110 may generate touch information on a touch of the pet thereon. In one embodiment, for example, the touch information may include information about the feature points of the sole of the pet's foot.

Such an operation of the touch sensor 110 will be described later in detail with reference to FIGS. 3 to 8.

Figure 2B:
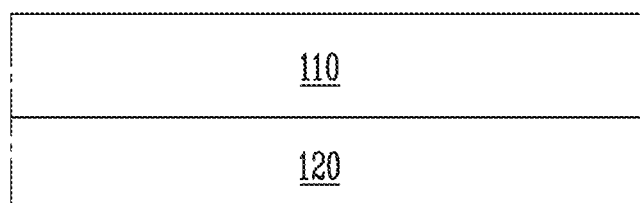
FIG. 2B is a diagram illustrating the structure of a cover layer in accordance with an alternative embodiment of the disclosure.

FIG. 2B is a diagram illustrating the structure of a cover layer 100b in accordance with an alternative embodiment of the disclosure. The cover layer 100b shown in FIG. 2B may be substantially the same as the cover layer 100a of FIG. 2A except that the cover layer 100b further includes a display panel 120 as a component thereof. The same or like elements shown in FIG. 2B have been labeled with the same reference characters as used above to describe the embodiments of the cover layer 100a shown in FIG. 2A, and any repetitive detailed description thereof will hereinafter be omitted or simplified.

Referring to FIG. 2B, an embodiment of the cover layer 100b may include a touch sensor 110 and a display panel 120.

In such an embodiment, as shown in FIG. 2B, the touch sensor 110 and the display panel 120 may be successively stacked one on the other, but the disclosure is not limited thereto. Alternatively, the sequence in which the touch sensor 110 and the display panel 120 are stacked may be modified in various ways.

The display panel 120 may display an image corresponding to input image data. In an embodiment, the display panel 120 may be a liquid crystal display ("LCD") panel, an organic light emitting display ("OLED") panel, an electrophoretic display panel, or an electro wetting display panel. The type of the display panel 120 is not limited to a specific type of display panel.

The cover layer 100b may be flexible. The display panel 120 may be a panel having flexibility such that the display panel 120 may be bent by external force in the same manner as a plastic panel or a thin metal panel.

In an embodiment, the display panel 120 may display an image under the control of the controller 30 (refer to FIG. 10).

In an embodiment, the display panel 120 may display an image along the perimeter of a portion of the cover layer 100b which is in contact with the user. The display panel 120 may display an image corresponding to the operating conditions of the security device 10.

Figure 2C:
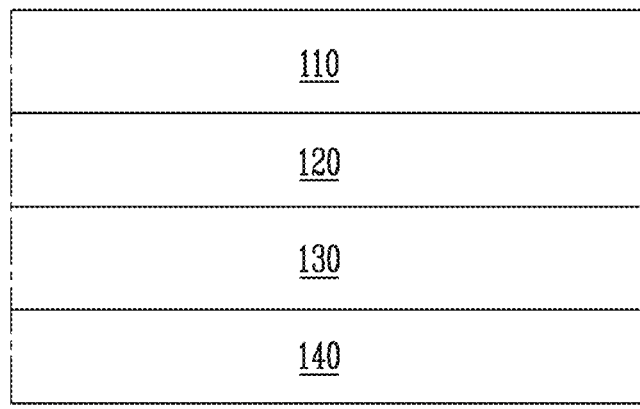
FIG. 2C is a diagram illustrating the structure of a cover layer in accordance with another alternative embodiment of the disclosure.

FIG. 2C is a diagram illustrating the structure of a cover layer 100c in accordance with an embodiment of the disclosure. The cover layer 100c shown in FIG. 2C may be substantially the same as the cover layer 100b of FIG. 2B except that the cover layer 100b further include a pressure sensor 130 and a haptic module 140 as components thereof. The same or like elements shown in FIG. 2B have been labeled with the same reference characters as used above to describe the embodiments of the cover layer 100a and 100b shown in FIGS. 2A and 2B, and any repetitive detailed description thereof will hereinafter be omitted or simplified.

Referring to FIG. 2C, an embodiment of the cover layer 100c may include a touch sensor 110, a display panel 120, the pressure sensor 130, and the haptic module 140.

In such an embodiment, as shown in FIG. 2C, the touch sensor 110, the display panel 120, the pressure sensor 130 and the haptic module 140 are successively stacked one on another, but the disclosure is not limited thereto. Alternatively, the sequence in which the touch sensor 110, the display panel 120, the pressure sensor 130, and the haptic module 140 are stacked may be modified in various ways.

The pressure sensor 130 may sense variation in pressure by a touch of a user. In one embodiment, for example, the variation in pressure may be caused by a finger of the user, a palm of the user or the like, which is a part of the body of the user. The target to be sensed by the pressure sensor 130 may include variation in the pressure by the touch.

The pressure sensor 130 may generate pressure information on the variation in pressure by the touch of the user. In one embodiment, for example, the pressure information may be additionally included in the above-mentioned touch information.

In an embodiment, the pressure sensor 130 may sense variation in pressure by a touch of a pet. In one embodiment, for example, the variation in pressure by the touch of the pet may be caused by the sole of the pet's foot. A target to be sensed by the pressure sensor 130 may include variation in pressure by the touch.

In an embodiment, the pressure sensor 130 may generate pressure information on the variation in the pressure by the touch of the pet. In on embodiment, for example, the pressure information may be additionally included in the above-mentioned touch information.

The haptic module 140 may generate various haptic effects that the user touching a cover layer 100c can feel, e.g., a vibration effect.

The haptic module 140 may vibrate in at least one of a plurality of vibration patterns. The haptic module 140 may provide or generate a vibration having at least one of the vibration patterns to the user.

In an embodiment, the magnitude or pattern of vibration generated by the haptic module 140 may be controlled by the controller 30 (refer to FIG. 10). In one embodiment, for example, the haptic module 140 may combine different vibration patterns and provide a vibration having a combined vibration patterns, or may successively provide vibrations having the different vibration patterns.

In an embodiment, the haptic module 140 may provide a vibration to a portion of the cover layer 100c that is in contact with the user.

The haptic module 140 may generate not only vibration but also various haptic effects, e.g., an effect of stimulation caused by pins which are arranged to make vertical contact with a surface of the skin of the user, discharge or suction force of air through discharge or suction holes, an element brushing by the surface of the skin of the user, an electrode making contact with the skin of the user, or electrostatic force, and a cold or hot sensation effect using an element having a heat-absorbing or heat-generating function.

In such an embodiment, the haptic module 140 provide a haptic effect to the user by making direct contact with the user, or the haptic module 140 may be embodied in a way such that the user may feel haptic effect through the muscular sense of the fingers of the user or an arm of the user, for example.

Figure 3:
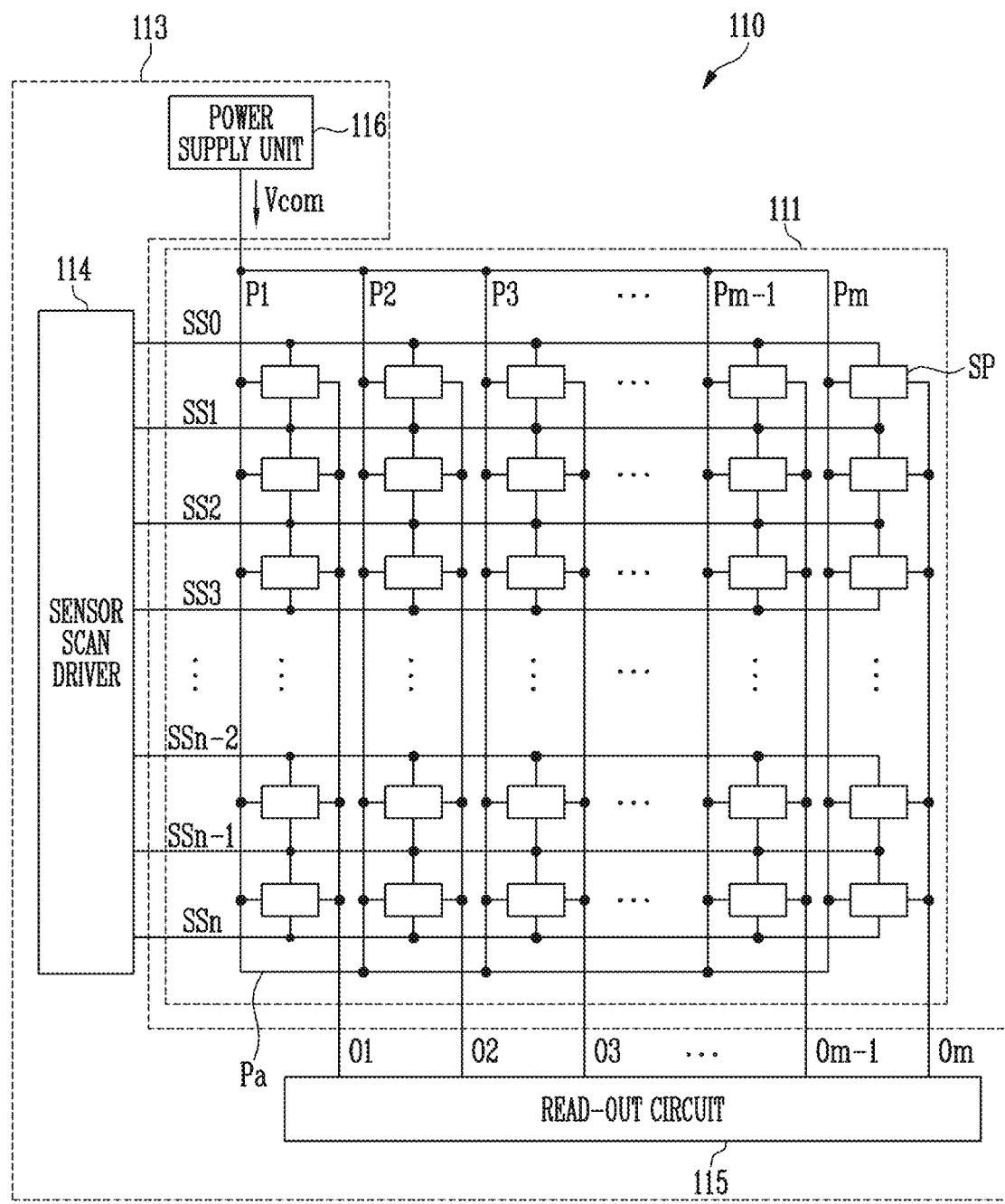
FIG. 3 is a diagram illustrating a touch sensor in accordance with an embodiment of the disclosure.
Figure 4:
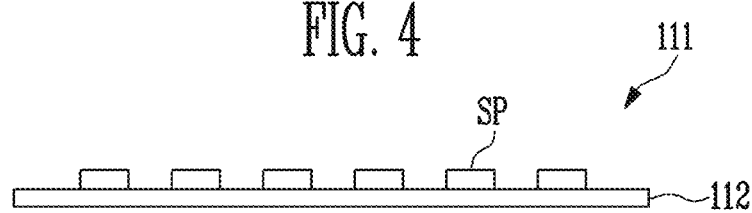
FIG. 4 is a partial sectional view of a sensor unit of the touch sensor shown in FIG. 3.

FIG. 3 is a diagram illustrating a touch sensor 110 in accordance with an embodiment of the disclosure. FIG. 4 is a partial sectional view of a sensor unit in the touch sensor 110 shown in FIG. 3.

Such an embodiment of the touch sensor 110 may sense a touch that occurs thereon. In such an embodiment the touch may be a touch of a user or a touch of a pet.

Referring to FIGS. 3 and 4, an embodiment of the touch sensor 110 may include a sensor unit 111.

The sensor unit 111 may include a substrate 112, and a plurality of sensor pixels SP.

The substrate 112 may include or be made of an insulating material such as glass or resin. In an embodiment, the substrate 112 may include or be made of a material having flexibility to be bendable or foldable, and may have a single layer structure or a multilayer structure.

In one embodiment, for example, the substrate 112 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the substrate 112 may be variously selected. In an alternative embodiment, the substrate 112 may also be made of fiber-reinforced plastic ("FRP") or the like.

The sensor pixels SP may be disposed on the substrate 112. The sensor pixels SP may be coupled with sensor scan lines SS0 to SSn and output lines O1 to Om.

The sensor pixels SP may receive sensor scan signals through the sensor scan lines SS0 to SSn. The sensor pixels SP may output predetermined current corresponding to a touch state to the output lines O1 to Om during a supply period for the sensor scan signal.

The sensor scan lines SS0 to SSn may be disposed on the substrate 112, may extend predetermined lengths in a first direction (e.g., an X-axis direction), and may be connected or coupled to the sensor pixels SP on a line-by-line basis.

The output lines O1 to Om may be disposed on the substrate 112, and may extend in a second direction (e.g., a Y-axis direction) and be connected or coupled to the sensor pixels SP on a line-by-line basis.

The sensor pixels SP may be connected or coupled to reference voltage lines P1 to Pm, and may be supplied with a reference voltage Vcom through the reference voltage lines P1 to Pm.

The reference voltage lines P1 to Pm may extend predetermined lengths in the second direction (e.g., the Y-axis direction), and may be connected or coupled to the sensor pixels SP on a line-by-line basis.

In one embodiment, for example, the reference voltage lines P1 to Pm may be arranged in parallel to the output lines O1 to Om.

However, the arrangement direction of the reference voltage lines P1 to Pm may be variously modified. In an alternative embodiment, the reference voltage lines P1 to Pm may be arranged in parallel to, for example, the sensor scan lines SS0 to SSn.

The reference voltage lines P1 to Pm may be electrically connected or coupled to each other to maintain a same potential as each other.

In one embodiment, for example, the reference voltage lines P1 to Pm may be electrically connected or coupled to each other in the perimeter of the substrate 112 via separate wiring Pa.

In an embodiment, the touch sensor 110 may further include a sensor driving unit 113. The sensor driving unit 113 may include a sensor scan driver 114 for driving the touch sensor 110, a read-out circuit 115, and a power supply unit (or power supplier) 116.

The sensor scan driver 114 may supply sensor scan signals to the sensor pixels SP through the sensor scan lines SS0 to SSn.

In one embodiment, for example, the sensor scan driver 114 may sequentially output the sensor scan signals to the sensor scan lines SS0 to SSn.

The sensor scan signals may have voltage levels predetermined to turn on transistors which are supplied with the sensor scan signals.

For connection with the sensor scan lines SS0 to SSn, the sensor scan driver 114 may be directly mounted on the substrate 112 or may be coupled to the substrate 112 through a separate component such as a flexible printed circuit board ("FPCB").

The read-out circuit 115 may receive signals (e.g., currents), which is output from the sensor pixels SP, through the output lines O1 to Om.

In one embodiment, for example, when the sensor scan driver 114 sequentially supplies the sensor scan signals, the sensor pixels SP may be selected on a line-by-line basis, and the read-out circuit 115 may sequentially receive currents output from the sensor pixels SP selected on a line basis.

In such an embodiment, the read-out circuit 115 may recognize current touch information by sensing a change in current of the sensor scan signals from the sensor pixels SP.

For connection with the output lines O1 to Om, the read-out circuit 115 may be directly mounted on the substrate 112, or may be coupled with the substrate 112 by a separate component such as a FPCB.

The power supply unit 116 may supply a reference voltage Vcom to the sensor pixels SP through the reference voltage lines P1 to Pm.

For connection with the reference voltage lines P1 to Pm, the power supply unit 116 may be directly mounted on the substrate 112, or may be coupled with the substrate 112 by a separate component such as a FPCB.

In an embodiment, as show in FIG. 3, the sensor scan driver 114, the read-out circuit 115 and the power supply unit 116 may be separately provided, but not being limited thereto. Alternatively, at least some of the sensor scan driver 114, the read-out circuit 115 and the power supply unit 116 may be integrated with each other if desired.

The sensor scan driver 114, the read-out circuit 115 and the power supply unit 116 may be installed using any of various methods, such as chip-on-glass, chip-on-plastic, tape-carrier-package, and chip-on-film methods.

Figure 5:
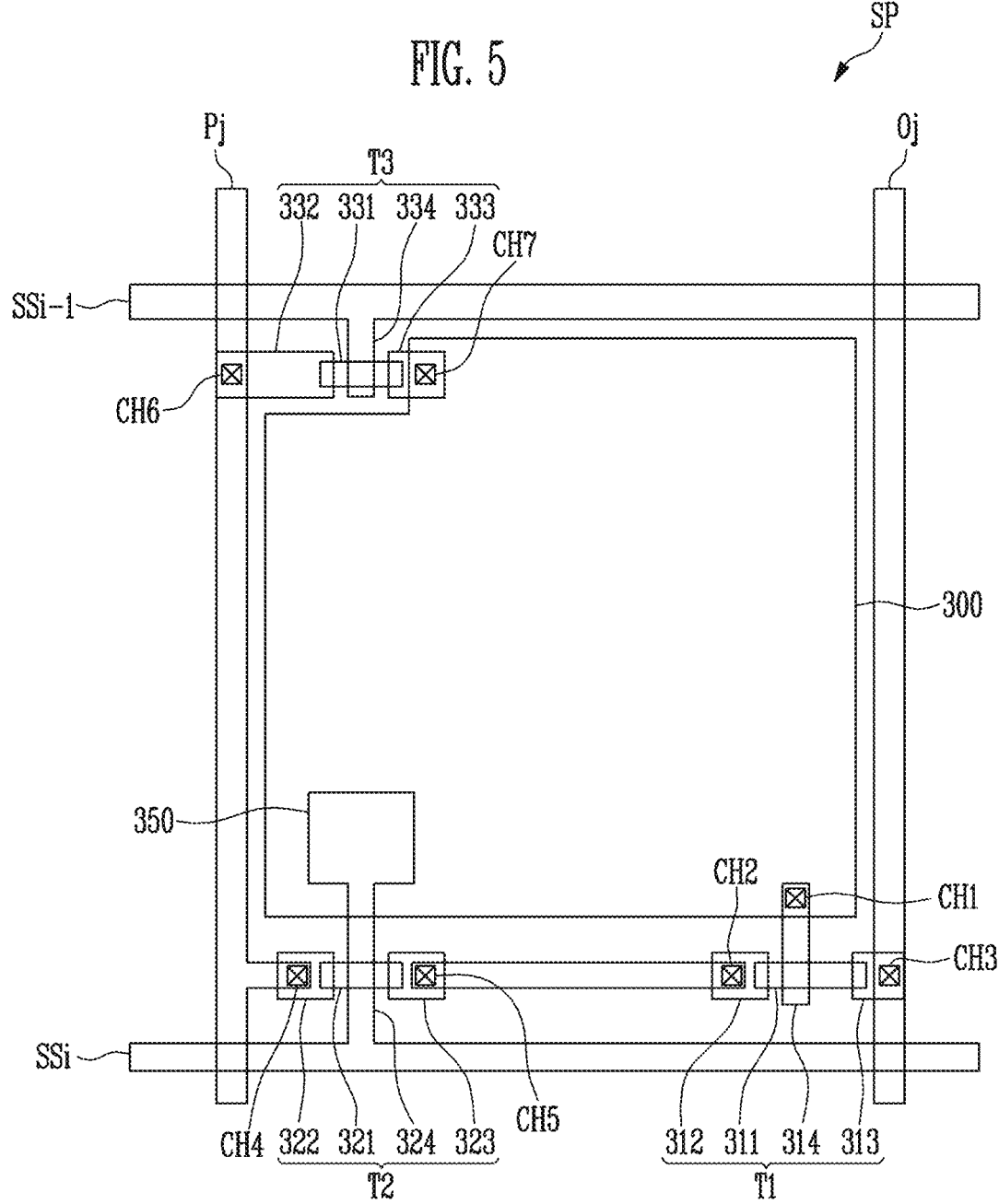
FIG. 5 is a plan view illustrating a sensor pixel in accordance with an embodiment of the disclosure.

FIG. 5 is a plan view illustrating a sensor pixel in accordance with an embodiment of the disclosure. For convenience of illustration and description, FIG. 5 shows an embodiment a pixel connected or coupled to an i-th sensor scan line SSi and a j-th output line Oj is illustrated, where i is an integer of 2 or greater, and j is a natural number.

Referring to FIG. 5, an embodiment of the sensor pixel SP may include a sensor electrode 300, a first transistor T1, a second transistor T2, a third transistor T3, and a capacitor electrode 350.

The first transistor T1 may control a current flowing to the j-th output line Oj. To control the current flowing to the j-th output line Oj, the first transistor T1 may be coupled between the j-th output line Oj and the second transistor T2.

In one embodiment, for example, the first transistor T1 may include a first electrode 312 connected or coupled to a second electrode 323 of the second transistor T2, a second electrode 313 connected or coupled to the j-th output line Oj, a gate electrode 314 connected or coupled to the sensor electrode 300, and a semiconductor layer 311 coupled between the first electrode 312 and the second electrode 313.

The gate electrode 314, the first electrode 312 and the second electrode 313 of the first transistor T1 may be connected or coupled to other components through respective contact holes CH1, CH2 and CH3.

Therefore, the first transistor T1 may control a current Io (shown in FIG. 7) which is output to the j-th output line Oj in response to the potential of the sensor electrode 300.

The second transistor T2 may be coupled between a j-th reference voltage line Pj and the first transistor T1.

In one embodiment, for example, the second transistor T2 may include a first electrode 322 connected or coupled to the j-th reference voltage line Pj, a second electrode 323 connected or coupled to the first electrode 312 of the first transistor T1, a gate electrode 324 connected or coupled to the i-th sensor scan line SSi, and a semiconductor layer 321 connected or coupled between the first electrode 322 and the second electrode 323.

The first electrode 322 and the second electrode 323 of the second transistor T2 may be connected or coupled to other components through respective contact holes CH4 and CH5.

In such an embodiment, the second transistor T2 may be turned on when a sensor scan signal is supplied to the i-th sensor scan line SSi. When the second transistor T2 is turned on, the reference voltage Vcom (shown in FIG. 3) may be applied to the first electrode 312 of the first transistor T1.

The third transistor T3 may be coupled between the j-th reference voltage line Pj and the sensor electrode 300.

In one embodiment, for example, the third transistor T3 may include a first electrode 332 connected or coupled to the j-th reference voltage line Pj, a second electrode 333 connected or coupled to the sensor electrode 300, a gate electrode 334 connected or coupled to the (i−1)-th sensor scan line SSi−1, and a semiconductor layer 331 connected or coupled between the first electrode 332 and the second electrode 333.

The first electrode 332 and the second electrode 333 of the third transistor T3 may be connected or coupled to other components through respective contact holes CH6 and CH7.

In such an embodiment, the third transistor T3 may be turned on when a sensor scan signal is supplied to the (i−1)-th sensor scan line SSi−1. When the third transistor T3 is turned on, the voltage of the sensor electrode 300 may be initialized to the reference voltage Vcom.

The capacitor electrode 350 may be disposed to overlap the sensor electrode 300, and may thus form a capacitor with the sensor electrode 300.

The capacitor electrode 350 may be connected or coupled to the i-th sensor scan line SSi. In one embodiment, for example, the capacitor electrode 350 may be connected or coupled to the i-th sensor scan line SSi through the gate electrode 324 of the second transistor T2.

In such an embodiment, the capacitor electrode 350 and the gate electrode 324 of the second transistor T2 may include or be made of a same material as that of the i-th sensor scan line SSi.

The sensor electrode 300 may form a capacitor with the capacitor electrode 350 and a finger or the like of the user.

The sensor electrode 300 may include a conductive material. In one embodiment, for example, the conductive material may include a metal material, an alloy of metal materials, a conductive polymer, or a transparent conductive material.

In such an embodiment, the metal material may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead, for example.

In such an embodiment, the conductive polymer may include polythiophene, polypyrrole, polyaniline, polyacetylene and polyphenylene compounds and a mixtures thereof, for example. In one embodiment, for example, the conductive polymer may be a poly-3,4-ethylenedioxythiophene/polystyrenesulfonate ("PEDOT/PSS") compound of the polythiophene conductive polymer.

In such an embodiment, the transparent conductive material may include silver nanowires (AgNW), indium tin oxide ("ITO"), indium zinc oxide ("IZO"), antimony zinc oxide ("AZO"), indium tin zinc oxide ("ITZO"), zinc oxide (ZnO), tin oxide ($SnO_2$), a carbon nanotube, and grapheme, for example.

Figure 6A:
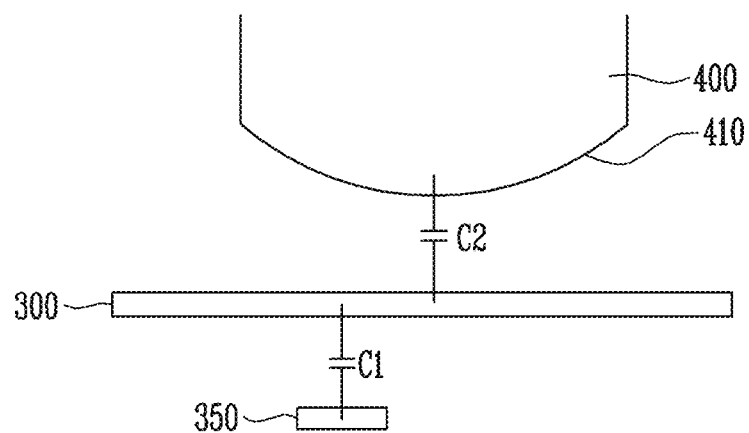
FIGS. 6A and 6B are diagrams illustrating a change in capacitance of a second capacitor related to a sensor electrode depending on a ridge and a valley of a fingerprint.
Figure 6B:
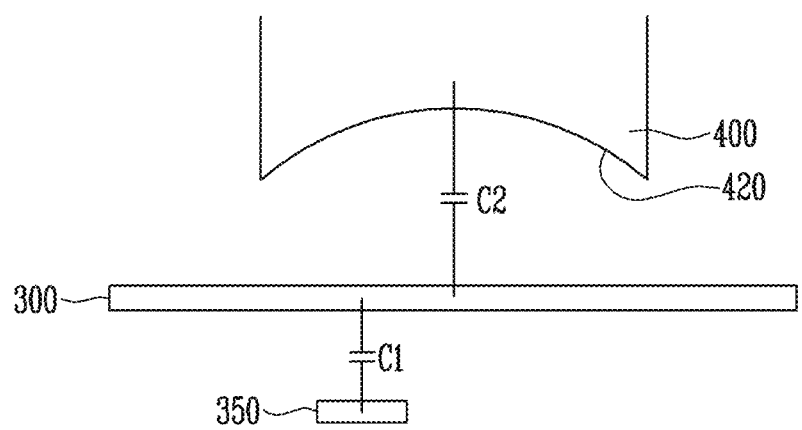

FIGS. 6A and 6B are diagrams illustrating a change in capacitance of a second capacitor related to the sensor electrode 300 depending on a ridge and a valley of a fingerprint. In particular, FIG. 6A illustrates a state in which a ridge 410 of a finger 400 is located on a sensor pixel, and FIG. 6B illustrates a state in which a valley 420 of the finger 400 is located on the sensor pixel.

Referring to FIGS. 6A and 6B, the sensor electrode 300 and the capacitor electrode 350 may form a first capacitor C1. The sensor electrode 300 and the capacitor electrode 350 may be spaced apart from each other, and at least one insulating layer (not illustrated) may be interposed therebetween.

When the finger 400 of the user is placed on the sensor pixel to recognize a fingerprint, the sensor electrode 300 and the finger 400 may form a second capacitor C2.

In such an embodiment, the second capacitor C2 is a variable capacitor, the capacitance of which may vary depending on whether the ridge 410 or valley 420 of the fingerprint is placed on the sensor electrode 300.

Since the distance between the ridge 410 and the sensor electrode 300 is shorter than the distance between the valley 420 and the sensor electrode 300, the capacitance of the second capacitor C2 in the state where the ridge 410 is placed on the sensor electrode 300, as shown in FIG. 6A, and the capacitance of the second capacitor C2 in the state where the valley 420 is placed on the sensor electrode 300, as illustrated in FIG. 6B, may differ from each other.

Referring to FIGS. 3 to 6A and 6B, since a change in the capacitance of the second capacitor C2 influences the output current Io of the sensor pixel SP, the read-out circuit 115 may detect or recognize the fingerprint of the user by sensing a change in the output current Io.

A sensor protective layer (not shown) may be disposed on the sensor electrode 300. The sensor protective layer (not shown) may be used as a surface to be touched by the user.

The read-out circuit 115 may detect or recognize the palm print of the user in the foregoing manner.

In an embodiment, the read-out circuit 115 may detect or recognize the feature points of the sole of the pet's foot.

Figure 7:
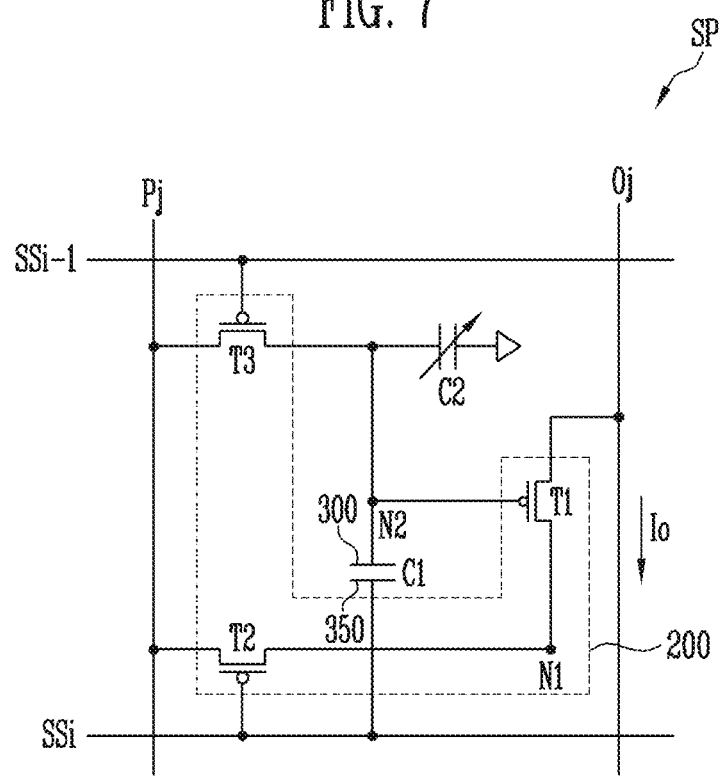
FIG. 7 is a diagram illustrating an embodiment of an equivalent circuit of the sensor pixel shown in FIG. 5.
Figure 8:
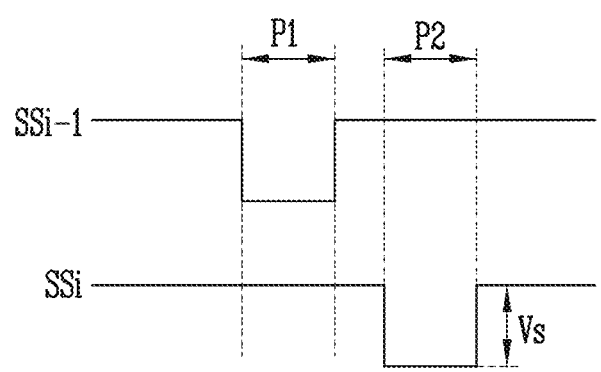
FIG. 8 is a waveform diagram illustrating the operation of the sensor pixel shown in FIG. 7.

FIG. 7 is a diagram illustrating an embodiment of the equivalent circuit diagram of the sensor pixel shown in FIG. 5. FIG. 8 is a waveform diagram illustrating the operation of the sensor pixel shown in FIG. 7.

For convenience of illustration and description, a sensor pixel SP connected or coupled to an i-th sensor scan line SSi, an (i−1)-th sensor scan line SSi−1, and a j-th output line Oj is illustrated in FIG. 7, and a sensor scan signal that is supplied to the (i−1)-th sensor scan line SSi−1 and a sensor scan signal that is supplied to the i-th sensor scan line SSi are illustrated in FIG. 8.

Referring to FIG. 7, the sensor pixel SP may include a sensor electrode 300, a capacitor electrode 350, a first transistor T1, a second transistor T2 and a third transistor T3.

In an embodiment, as described above, the sensor electrode 300 and the capacitor electrode 350 may define or constitute the first capacitor C1. The first transistor T1, the second transistor T2 and the third transistor T3 may define or form a sensor circuit 200.

The second capacitor C2, which is a variable capacitor, may be formed by the sensor electrode 300 and the finger 400, as described above with reference to FIGS. 6A and 6B. Here, the capacitance of the second capacitor C2 may change depending on the distance between the sensor electrode 300 and the finger 400, information about whether the valley or ridge of a fingerprint is placed on the sensor electrode 300, the magnitude of pressure applied by a touch or the like may be obtained by sensing the change in capacitance of the second capacitor C2.

The first transistor T1 may control a current flowing to the j-th output line Oj. For this operation, the first transistor T1 may be coupled between the j-th output line Oj and the second transistor T2.

In such an embodiment, the first transistor T1 may be coupled between the j-th output line Oj and a first node N1, and the gate electrode thereof may be connected or coupled to a second node N2.

In one embodiment, for example, first transistor T1 may include a first electrode connected or coupled to a second electrode of the second transistor T2, a second electrode connected or coupled to the j-th output line Oj, and a gate electrode connected or coupled to the sensor electrode 300.

The second transistor T2 may be coupled between a j-th reference voltage line Pj and the first transistor T1.

In such an embodiment, the second transistor T2 may be coupled between the j-th reference voltage line Pj and the first node N1, and the gate electrode thereof may be connected or coupled to the i-th sensor scan line SSi.

In one embodiment, for example, the second transistor T2 may include a first electrode connected or coupled to the j-th reference voltage line Pj, a second electrode connected or coupled to the first electrode of the first transistor T1, and a gate electrode connected or coupled to the i-th sensor scan line SSi.

Therefore, the second transistor T2 may be turned on when a sensor scan signal is supplied to the i-th sensor scan line SSi. When the second transistor T2 is turned on, a reference voltage Vcom may be applied to the first electrode of the first transistor T1.

The third transistor T3 may be coupled between the j-th reference voltage line Pj and the sensor electrode 300.

In such an embodiment, the third transistor T3 may be coupled between the second node N2 and the j-th reference voltage line Pj, and the gate electrode thereof may be connected or coupled to the (i−1)-th sensor scan line SSi−1.

In one embodiment, for example, the third transistor T3 may include a first electrode connected or coupled to the j-th reference voltage line Pj, a second electrode connected or coupled to the sensor electrode 300, and a gate electrode coupled to the (i−1)-th sensor scan line SSi−1.

Therefore, the third transistor T3 may be turned on when a sensor scan signal is supplied to the (i−1)-th sensor scan line SSi−1. When the third transistor T3 is turned on, the voltage of the sensor electrode 300 may be initialized to the reference voltage Vcom.

The capacitor electrode 350 may be disposed to overlap the sensor electrode 300, and may then form the first capacitor C1 with the sensor electrode 300.

The capacitor electrode 350 may be connected or coupled to the i-th sensor scan line SSi.

Thus, the first capacitor C1 may be coupled between the second node N2 and the i-th sensor scan line SSi.

The second capacitor C2 may be connected or coupled to the second node N2.

The first node N1 is a node to which the first electrode of the first transistor T1 and the second electrode of the second transistor T2 are commonly connected, and the second node N2 is a node to which the sensor electrode 300, the gate electrode of the first transistor T1 and the second electrode of the third transistor T3 are commonly connected.

In such an embodiment, the first electrode of each of the transistors T1, T2 and T3 may be one of a source electrode and a drain electrode, and the second electrode of each of the transistors T1, T2 and T3 may be the other of a source electrode and a drain electrode. In one embodiment, for example, the first electrode is set to a source electrode, and the second electrode may be set to a drain electrode.

In an embodiment, as shown in FIG. 7, the transistors T1, T2 and T3 may be p-type metal-oxide-semiconductor ("PMOS") transistors, but not being limited thereto. Alternatively, the transistors T1, T2 and T3 may be embodied by n-type metal-oxide-semiconductor ("NMOS") transistors.

FIG. 8 is a waveform diagram illustrating the operation of the sensor pixel shown in FIG. 7. Referring to FIGS. 7 and 8, during a first period P1, a sensor scan signal may be supplied to the (i−1)-th sensor scan line SSi−1.

Therefore, during the first period P1, the third transistor T3 may remain turned on, and the second node N2 may be initialized to the reference voltage Vcom which is applied from the j-th reference voltage line Pj.

Thereafter, during a second period P2, the sensor scan signal may be supplied to an i-th sensor scan line SSi.

Therefore, during the second period P2, the second transistor T2 may remain turned on, and the current Io may flow from the j-th reference voltage line Pj to the j-th output line Oj through the second transistor T2 and the first transistor T1.

In an embodiment, the first transistor T1 may control the amount of output current Io in response to a gate voltage (i.e., voltage applied to the second node N2).

In one embodiment, for example, the output current Io may change depending on the gate voltage Vg of the first transistor T1, and the gate voltage Vg of the first transistor T1 may be determined by the following equation: $Vg=Vcom+\{Vc1/(Vc1+Vc2)\} \times Vs$.

In the equation above, Vcom denotes the reference voltage, Vc1 denotes the capacitance of the first capacitor C1, Vc2 denotes the capacitance of the second capacitor C2, and Vs denotes a change in the voltage of the first sensor scan signal that is supplied to the i-th sensor scan line SSi.

Figure 9:
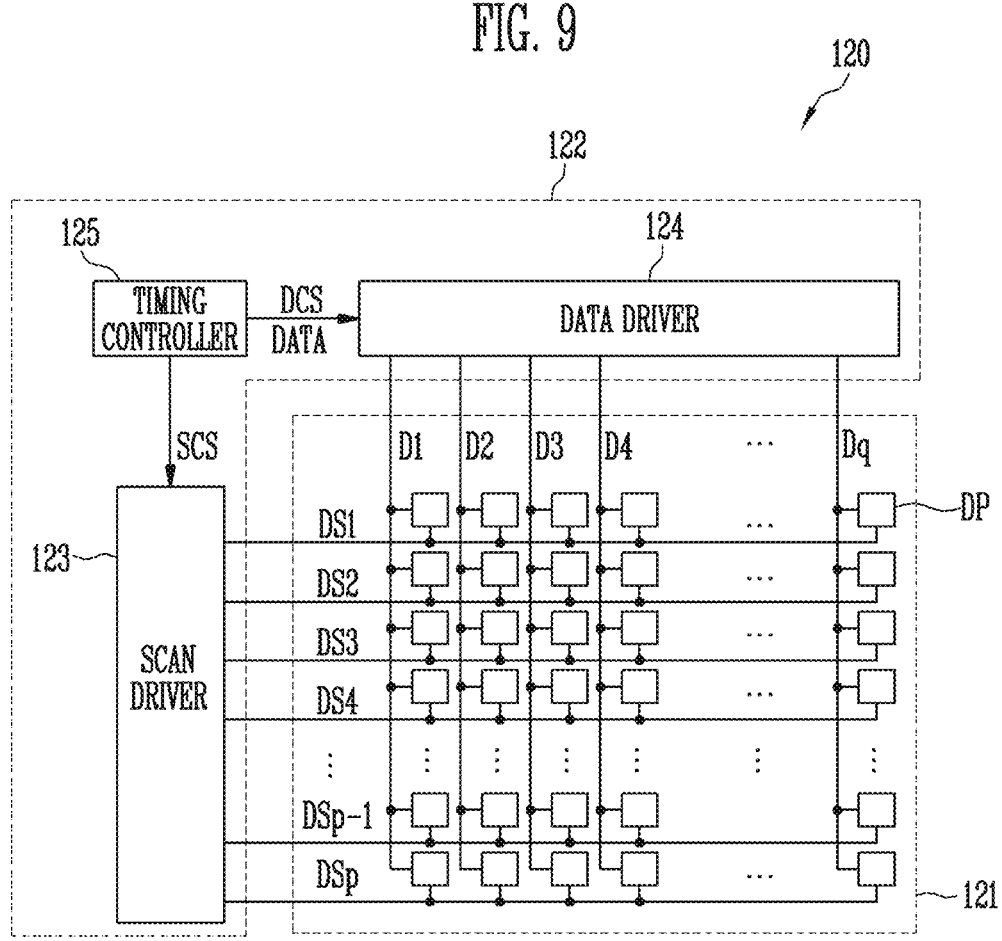
FIG. 9 is a diagram illustrating a display panel in accordance with an embodiment of the disclosure.

FIG. 9 is a diagram illustrating a display panel 120 in accordance with an embodiment of the disclosure.

Referring to FIG. 9, an embodiment of the display panel 120 may include a display pixel unit 121.

The display pixel unit 121 may include a plurality of display pixels DP.

The display pixels DP may be connected or coupled to data lines D1 to Dq and display scan lines DS1 to DSp. In one embodiment, for example, the display pixels DP may be arranged in the form of a matrix at intersections of the data lines D1 to Dq and the display scan lines DS1 to DSp.

The respective display pixels DP may be supplied with data signals and display scan signals through the data lines D1 to Dq and the display scan lines DS1 to DSp.

Each display pixel DP may include a light-emitting element (e.g., an organic light-emitting diode), and may generate light corresponding to a data signal using current flowing from a first power supply ELVDD into a second power supply ELVSS via the light-emitting element.

In an embodiment, The display panel 120 may further include a display driving unit 122 for driving the display pixel unit 121.

The display driving unit 122 may include a scan driver 123, a data driver 124 and a timing controller 125.

The scan driver 123 may provide display scan signals to the display scan lines DS1 to DSp in response to a scan driver control signal SCS. In one embodiment, for example, the scan driver 123 may sequentially supply display scan signals to the display scan lines DS1 to DSp.

For connection with the display scan lines DS1 to DSp, the scan driver 123 may be directly mounted on a display substrate or may be attached or coupled to the display substrate through a separate component such as a FPCB.

The data driver 124 may receive a data driver control signal DCS and image data DATA from the timing controller 125, and generate data signals based on the data driver control signal DCS and the image data DATA.

The data driver 124 may supply the data signals to the data lines D1 to Dq.

For connection with the data lines D1 to Dq, the data driver 124 may be directly mounted on the display substrate or may be attached or coupled to the display substrate through a separate component such as a FPCB.

In an embodiment, the display substrate may be substantially the same as the substrate 112 shown in FIG. 4.

When a display scan signal is provided through a certain display scan line, some display pixels DP connected or coupled to the certain display scan line may be supplied with data signals transmitted from the data lines D1 to Dq and may emit light at luminance levels corresponding to the supplied data signals.

The timing controller 125 may generate control signals for controlling the scan driver 123 and the data driver 124.

In one embodiment, for example, the control signals may include a scan driver control signal SCS for controlling the scan driver 123, and a data driver control signal DCS for controlling the data driver 124.

The timing controller 125 may provide the scan driver control signal SCS to the scan driver 123, and provide the data driver control signal DCS to the data driver 124.

The timing controller 125 may convert the image data DATA in conformity with the specification of the data driver 124 and may provide the converted data to the data driver 124.

In an embodiment, as shown in FIG. 9, the scan driver 123, the data driver 124 and the timing controller 125 are separately provided, but not being limited thereto. Alternatively, at least some of the foregoing components may be integrated with each other if desired.

In an embodiment, the display driving unit 122 may be integrated with the sensor driving unit 113 shown in FIG. 3.

The scan driver 123, the data driver 124 and the timing controller 125 may be installed using any of various methods, such as a chip-on-glass method, a chip-on-plastic method, a tape-carrier-package method, and a chip-on-film method.

FIG. 10 is a diagram illustrating a security system in accordance with an embodiment of the disclosure. Referring to FIG. 10, an embodiment of the security system 1 may include a security device 10, an authentication unit 20, and a controller 30.

The security device 10 may include a door body 11, a door handle 12, a door locking unit 13, a door driving unit 14, and a cover layer 100.

The cover layer 100 may include a touch sensor 110 and a display panel 120.

In such an embodiment, the pressure sensor 130 and the haptic module 140 shown in FIG. 2C may be omitted, but the disclosure is not limited thereto.

The touch sensor 110 may sense a touch of the user and generate touch information TI about the touch. The touch sensor 110 may transmit the generated touch information TI to the authentication unit 20.

The touch sensor 110 may include a sensor unit 111 and a sensor driving unit 113.

The sensor unit 111 may include a plurality of sensor pixels SP (refer to FIG. 3).

The display panel 120 may display an image in response to a display panel control signal DPS received from the controller 30. In one embodiment, for example, the display panel control signal DPS may include image data related to at least one of a plurality of images.

The display panel 120 may include a display pixel unit 121 and a display driving unit 122.

The display pixel unit 121 may include a plurality of display pixels DP (refer to FIG. 9).

The door locking unit 13 may control the locking of the door body 11 under the control of the controller 30. In one embodiment, for example, the door locking unit 13 may receive a door locking signal DLS from the controller 30. The door locking unit 13 may control the locking of the door body 11 based on the door locking signal DLS.

The door driving unit 14 may control the operation of opening or closing the door body 11 under the control of the controller 30. In one embodiment, for example, the door driving unit 14 may receive a door driving signal DDS from the controller 30. The door driving unit 14 may control the operation of opening or closing the door body 11 based on the door driving signal DDS.

The authentication unit 20 may authenticate the user based on the touch information TI.

In an embodiment, the authentication unit 20 may include an authentication processing unit 21, a user information storage unit 22, and a temporary information storage unit 23.

The authentication processing unit 21 may receive the touch information TI and store the touch information TI in the temporary information storage unit 23.

The authentication processing unit 21 may compare the touch information TI with registration information data stored in the user information storage unit 22. In one embodiment, for example, the authentication processing unit 21 may check whether the touch information TI is matched with any one of the registration information data.

When the touch information TI is matched with any one of the registration information data, the authentication processing unit 21 may transmit the touch information TI, matched registration information data MI and an approval signal AS to the controller 30. Accordingly, in such an embodiment, if the user is a registered user, the authentication processing unit 21 may authenticate the user and transmit the touch information TI, the matched registration information data MI, and the approval signal AS to the controller 30.

In an embodiment, each of the registration information data may include information about the touch of the user.

The user information storage unit 22 may store the registration information data and provide the registration information data to the authentication processing unit 21 under the control of the authentication processing unit 21.

The temporary information storage unit 23 may store the touch information TI and provide the touch information TI to the authentication processing unit 21 under the control of the authentication processing unit 21.

In an embodiment, the user information storage unit 22 and the temporary information storage unit 23 may be integrated with each other into a single unit and disposed in the authentication processing unit 21.

The controller 30 may receive the touch information TI, the matched registration information data MI, and the approval signal AS from the authentication unit 20.

The controller 30 may control the general operation of the security device 10 based on the touch information TI, the matched registration information data MI, and the approval signal AS.

When the approval signal AS is received, the controller 30 may transmit a door locking signal DLS to the door locking unit 13 such that the door locking unit 13 may unlock the door body 11.

In an embodiment, as described above, since the controller 30 controls the locking of the door body 11 based on the touch information TI of the user, the security device 10 and the security system 1 including the security device 10 may have improved security performance.

When the approval signal AS is received, the controller 30 may transmit a door driving signal DDS to the door driving unit 14 such that the door driving unit 14 may perform an operation of opening the door body 11.

When the approval signal AS is received, the controller 30 may transmit a display panel control signal DPS to the display panel 120 based on the matched registration information data MI. In response to the display panel control signal DPS, the display panel 120 may display an image set corresponding to the user.

In an embodiment, images preset for respective users may be included in the corresponding registration information data, but the disclosure is not limited thereto. In one embodiment, for example, the images preset for the respective users may be stored in a memory 35 of the controller 30.

The controller 30 may include the memory 35. In an embodiment, the memory 35 may store the images set corresponding to the respective users. However, the disclosure is not limited to this.

In an embodiment, as shown in FIG. 10, the security device 10 may include a single door body 11, a single door locking unit 13, and a single door driving unit 14 as in the embodiments of the security device 10a to 10d described above with reference to FIGS. 1A to 1D. However, the disclosure is not limited to this. In one alternative embodiment, for example, the security system 1 may include a security device including a plurality of door bodies, a plurality of door locking units, and a plurality of door driving units as in the embodiments of the security device 10e described above with reference to FIG. 1E. In such an embodiment, the other components of the security system 1 may be modified in conformity with the security device including the plurality of door bodies, the plurality of door locking units, and the plurality of door driving units.

FIG. 11 is a flowchart of a method of operating the security system in accordance with an embodiment of the disclosure.

Referring to FIG. 11, in an embodiment of the method of operation the security system, the user may touch the security device 10 with his/her hand (S10).

The touch sensor 110 may generate touch information TI (S20).

The authentication unit 20 may compare the touch information TI with the registration information data (S30).

When the touch information TI is matched with any one of the registration information data (YES, S40), the authentication unit 20 may transmit the touch information TI, the matched registration information data MI and an approval signal AS to the controller 30 (S50).

The controller 30 may control the security device 10 based on the touch information TI, the matched registration information data MI, and the approval signal AS (S60).

In embodiments of the disclosure, a security device and a security system including the security device may perform an authentication process at the moment that a user touches the security device.

In embodiments of the disclosure, a security device and a security system including the security device may have improved security performance.

In embodiments of the disclosure, a security device and a security system including the security device may supply separately feed for respective pets.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the disclosure as set forth in the following claims.

What is claimed is:

1. A security device comprising:
   a door handle unit disposed on a door body;
   a cover layer comprising a touch sensor, wherein the cover layer covers the door handle unit; and
   a door locking unit which controls a locking of the door body,
   wherein
   the touch sensor comprises a plurality of sensor pixels, each of which includes a sensor electrode which forms a second capacitor with a hand of a user when a touch occurs thereon by the user, and
   the touch sensor generates touch information based on a change in capacitance of the second capacitor corresponding to the touch,
   wherein the touch information comprises information about at least one of a fingerprint of the user and a palm print of the user.

2. The security device according to claim 1, wherein the touch sensor further comprises:
   a plurality of sensor scan lines connected to the sensor pixels; and
   a plurality of output lines connected to the sensor pixels,
   a sensor pixel of the sensor pixels, which is connected to an i-th sensor scan line of the sensor scan lines and a j-th output line of the output lines, comprises:
   a first transistor comprising a gate electrode connected to the sensor electrode, wherein the first transistor controls a current to be outputted through the j-th output line;
   a second transistor comprising a gate electrode connected to the i-th sensor scan line, wherein the second transistor is connected between a reference voltage line and the first transistor; and
   a capacitor electrode which forms a first capacitor with the sensor electrode, and is connected to the i-th sensor scan line, wherein i is an integer number equal to or greater than 2, and j is a natural number.

3. The security device according to claim 2, wherein the sensor pixel further comprises a third transistor comprising a gate electrode connected to an (i−1)-th scan line of the scan lines, and
the third transistor is connected between the reference voltage line and the sensor electrode.

4. The security device according to claim 1, wherein the security device authenticates the user based on the touch information.

5. The security device according to claim 1, wherein the cover layer further comprises a pressure sensor which generates pressure information about a change in pressure of the touch of the user, and
the touch information comprises the pressure information.

6. The security device according to claim 5, wherein the cover layer further comprises a display panel which displays an image based on the touch information.

7. The security device according to claim 5, wherein the cover layer further comprises a haptic module which generates a haptic effect based on the touch information.

8. The security device according to claim 1, further comprising:
a door driving unit which performs an operation of opening or closing the door body based on the touch information.

9. The security device according to claim 8, wherein the cover layer has flexibility and covers an entire surface of the door handle unit.

\* \* \* \* \*